United States Patent [19]
Giraud

[11] 3,814,006
[45] June 4, 1974

[54] MACHINE FOR MANUFACTURING PANCAKES AND OTHER SIMILAR PRODUCTS

[75] Inventor: Abel Giraud, Andresy, France
[73] Assignee: Gideco, Andresy, France
[22] Filed: Feb. 12, 1973
[21] Appl. No.: 331,419

[30] Foreign Application Priority Data
Feb. 24, 1972  France .............................. 72.06262

[52] U.S. Cl. ................................ 99/423, 99/443 R
[51] Int. Cl. ....................... A21b 1/48, A47j 37/10
[58] Field of Search ...................... 99/424, 423, 443

[56] References Cited
UNITED STATES PATENTS
3,489,106   1/1970   Lostanlen ............................. 99/423
3,630,140   12/1971  Marrie ................................. 99/423

Primary Examiner—Robert L. Bleutge
Assistant Examiner—Arthur O. Henderson
Attorney, Agent, or Firm—Breitenfeld & Levine

[57] ABSTRACT

A machine for manufacturing pancakes and the like from a liquid paste having first, second and third substantially horizontal driven rollers in which the first has the larger diameter and is located adjacent to the second which is in nip relation with the third. The first has a smooth surface and is a heated cooking roller. The other two are rotated in opposite directions and have their lower parts immersed in a trough of paste. The third roller has a recess in its periphery to shape the liquid paste, permitted through the nip, on the smooth surfaced second roller so that the paste has a shape which when transferred from an upper surface of the second or transfer roller to the cooking roller gives the pancake its desired shape thereon.

15 Claims, 4 Drawing Figures

MACHINE FOR MANUFACTURING PANCAKES AND OTHER SIMILAR PRODUCTS

The present invention relates to a machine for manufacturing pancakes or other similar products having a circular or non-circular shape, obtained by cooking a film of liquid paste which may or may not include yeast on a heated surface.

A known machine of this type comprises a trough or tank for the liquid paste, a smooth cooking roller having a horizontal shaft which is rotated continuously or intermittently, a transfer and shaping device which firstly ensures the transportation of a film of liquid paste from the trough or tank and its simultaneous application to the heated surface of said roller whilst the latter rotates, and which secondly automatically varies the width of the film of paste transported in order to give the product resulting from the cooking the desired shape (for example circular) and a scraper or other like device ensuring the detachment of the product obtained by cooking the paste on the roller and its removal from the machine. In the machine in question, the tank for liquid paste is constituted by an elongated hopper located above the cooking roller and parallel to its shaft. The transfer and shaping device is constituted by the base of this hopper provided in the form of a flat narrow surface having apertures distributed along its length and by a pair of sliding strips arranged so as to alternately close and open said apertures when a slow reciprocating motion synchronized with the rotation of the cooking roller is imparted thereto. This arrangement has the drawback of being quite bulky and of necessitating relatively complicated actuating mechanisms; moreover it provides only an inaccurate control of the regularity of shape of the product obtained as well as of the uniformity of its thickness.

Machines for manufacturing pancakes are also known comprising a cooking roller which is not smooth but comprises surface members in relief, the contour of the evolute of which corresponds to that of the products to be obtained (in the present case circular). The cooking roller is thus located above the trough for liquid paste and the transfer of the latter is effected either directly or preferably by the intermediary of a coating roller of small diameter which is immersed in the paste and is rotated in order to carry the latter along in the form of a thin film which is deposited by contact on the surface members in relief of the cooking roller. Since the film of paste cannot be deposited on the other part of the roller due to their spacing with respect to the coating roller, it is in fact the surface members in relief which give the product obtained the desired shape. Pancakes are thus obtained which are perfectly round and have a remarkable uniformity of thickness, nevertheless the detachment of the product at the end of the cooking time requires special precautions due to the fact that since the cooking roller is not smooth, the detaching scraper may not be left in contact therewith throughout the entire duration of the rotating cycle. It is thus necessary, either to provide an additional mechanism actuated by cams with a view to automatically controlling the lifting of the scraper at the end of the cycle and its lowering at the beginning of the next cycle or even, in the absence of such a mechanism, to ensure the continuity of a support surface for the scraper by interconnecting the surface members in relief by joining strips; however this latter solution makes it necessary to detach the pancakes produced from each other by cutting their connecting strips.

The present invention relates to a machine of a new design which avoids or at least mitigates the aforementioned drawbacks whilst facilitating a precise control of the regularity of shape and of uniformity of thickness of the pancakes produced.

According to the invention there is provided a machine for manufacturing pancakes or other similar products comprising a trough or tank for the liquid paste, a smooth cooking roller having a horizontal shaft rotated continuously or intermittently, a transfer and shaping device which, firstly conveys a film of liquid paste from the trough or tank and deposits it on the heated surface of said roller whilst the latter rotates and which, secondly automatically varies the width of the film of paste in order to give the product resulting from the cooking the desired shape, which may be circular for example and a device ensuring the detachment of the product obtained by cooking the paste on the roller and its removal from the machine, the transfer and shaping device being composed of two rollers whose shafts are parallel to that of the cooking roller, namely a smooth transfer roller located in manner known per se adjacent to the cooking roller in such manner that its lower part is immersed in the liquid paste and having a rotational movement due to which it carries along a film of paste and deposits it on the cooking roller and a shaping roller bearing against said transfer roller at a point of the trajectory of the film of liquid paste, this roller whose rotation is synchronized with that of the cooking roller having on its periphery at least one recessed impression whose shape corresponds to that of the product to be obtained and the edges of which in contact with the transfer roller at any time limit the width of the film of paste carried along by the latter.

According to other features of the invention, the transfer roller rotates in the same direction as the cooking roller and at an adjustable speed, the value of which determines the thickness of the layer of paste deposited on this roller, whereas the shaping roller, which is also preferably immersed in the liquid paste at its lower part, is rotated in the opposite direction to the transfer roller and at an angular speed equal or proportional to that of the cooking roller. In the case of the most frequent application when it is desired to obtain products of circular shape, the evolute of the recessed impression in the surface of the shaping roller is an ellipse whose major axis is equal to the diameter of the product to be obtained and whose minor axis represents a fraction of the major axis equal to the ratio of the tangential speeds of the shaping and cooking rollers. According to yet another feature of the invention, the machine may be provided with a set of interchangeable shaping rollers having impressions which vary in number, shape and dimensions according to the features of the products to be manufactured.

Further features and advantages of the invention will become apparent on reading the ensuing description of two embodiments given as examples and with reference to the accompanying drawings in which.

Figure 1:
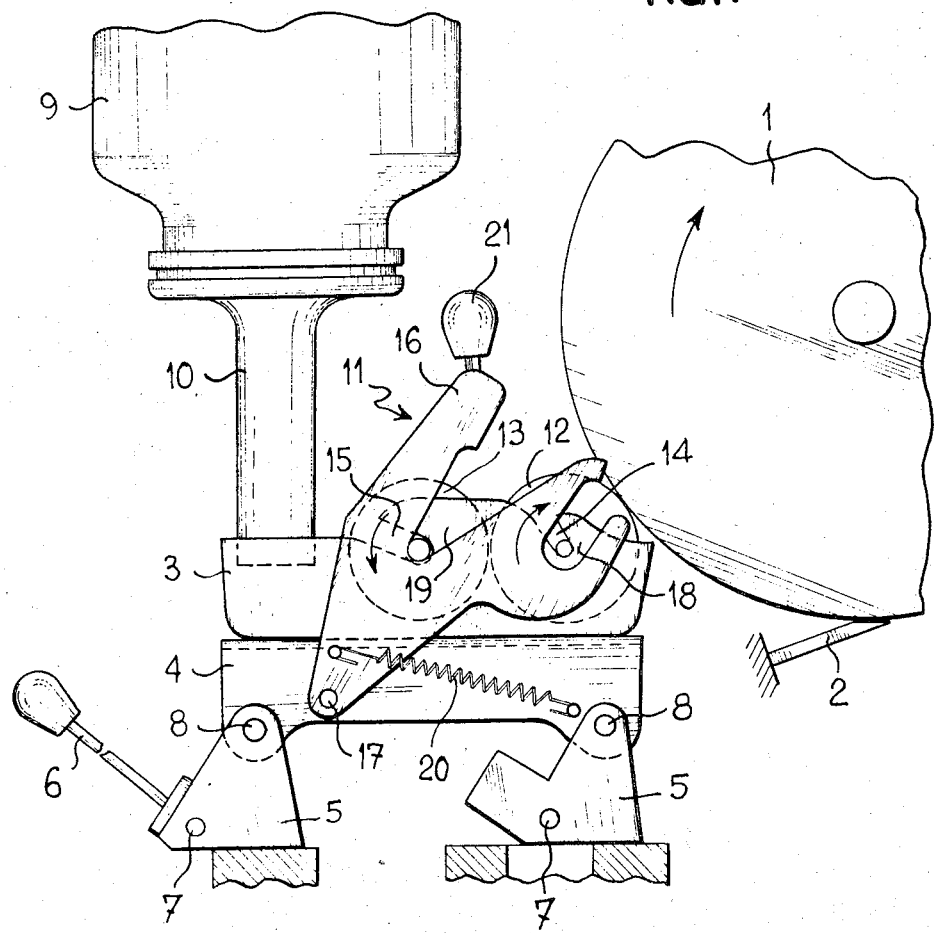
FIG. 1 is a simplified lateral elevational view of a machine according to the invention, this machine being reduced to its essential parts.

The machine illustrated in the accompanying drawings comprises, mounted on a frame which is not shown, a smooth cooking roller 1 having a horizontal shaft which, during operation, is rotated continuously or intermittently in the direction indicated by the arrow in FIG. 1. The surface of this roller is heated by means of incorporated electrical resistances, which are also not shown, the surface temperature being regulated by a thermostat device. A fixed scraper 2 disposed to bear against the surface of the cooking roller 1 at its lower part serves to detach the pancakes or other similar products at the end of the cooking cycle, these products then being placed on a conveyor belt (not shown) which removes them from the machine, possibly after having passed them across another heated surface in order to complete the cooking of the side which was not in contact with the cooking roller 1.

The unit for supplying a liquid paste comprises a paste trough 3 fixed to a rigid support 4 which in turn rests on a pivoted positioning system constituted by two triangular connecting rods 5, one of which is integral with an operating lever 6. These connecting rods 5 are mounted to pivot about fixed pins and are connected to the support 4 by pivots 8. As will be readily understood on examining FIG. 1 of the drawings, a force exerted on the lever 6 makes it possible to move back the supply unit from the operating position illustrated to another stable position slightly further from the cooking roller for the purpose of cleaning and maintenance. As a variation the supply unit could be permanently fixed to the frame of the machine, whilst the bearings supporting the cooking roller would rest on pivoted supports making it possible to remove the latter for the same purposes as afore-described. An inverted vessel 9 forming a tank for filling up with liquid paste is fixed above the trough 3 by means which are not shown and for this purpose the vessel is connected by a tubular aperture 10 at a certain level of the trough 3. The position of this aperture determines the height of the level of liquid paste in the trough 3, which remains constant by virtue of the principle used, for example in watering troughs for birds.

The transfer and shaping device which constitutes the object of the invention is indicated generally by the reference numeral 11. Its function is to convey a film of liquid paste from the trough 3 to deposit it on the heated surface of the cooking roller 1 during the rotation of the latter and simultaneously to vary the width of this film of paste in order to give the paste deposited on the cooking roller 1 the shape desired for the product to be obtained, this shape being circular in the application envisaged for the manufacture of pancakes. This device is composed essentially of two rollers having shafts parallel to that of the cooking roller, namely a smooth transfer roller 12 located in the immediate vicinity of the cooking roller 1 and a shaping roller 13 bearing against the transfer roller 12. As shown in FIG. 1 of the drawings, the ends of the shafts of these rollers are received in elongated notches 14 and 15 respectively provided in the lateral walls of the liquid paste trough 3. However, whereas the shaft of the transfer rollers 12 bears against the base of the notch 14 and is thus keyed in a position which allows only a narrow space between the surface of this roller and that of the cooking roller 1, the shaft of the shaping roller 13 does not reach the base of the notch 15 and this is to enable this roller to remain constantly in abutment against the transfer roller 12. On either side of the lateral walls of the trough 3 are located two forks 16 integral in rotation with each other and pivoted to the support 4 by means of a pin 17. Each of these two forks is provided with two notches, one 18 which surrounds one end of the shaft of the transfer roller 12 with play, and the other 19, one edge of which bears against one end of the shaft of the shaping roller 13 in order to transmit to the latter the elastic force of a spring 20 stretched between the fork 16 and a fixed point of the support 4; this elastic force provides sufficient pressure for ensuring that the shaping roller 13 is maintained in contact with the transfer roller 12. A knob 21 supported by the pivoted forks 16 makes it possible to tilt the latter rearwards and thus to release the shafts of the rollers 12 and 13 from their guide notches 14 and 15 for the purpose of cleaning or replacement.

Figure 3:
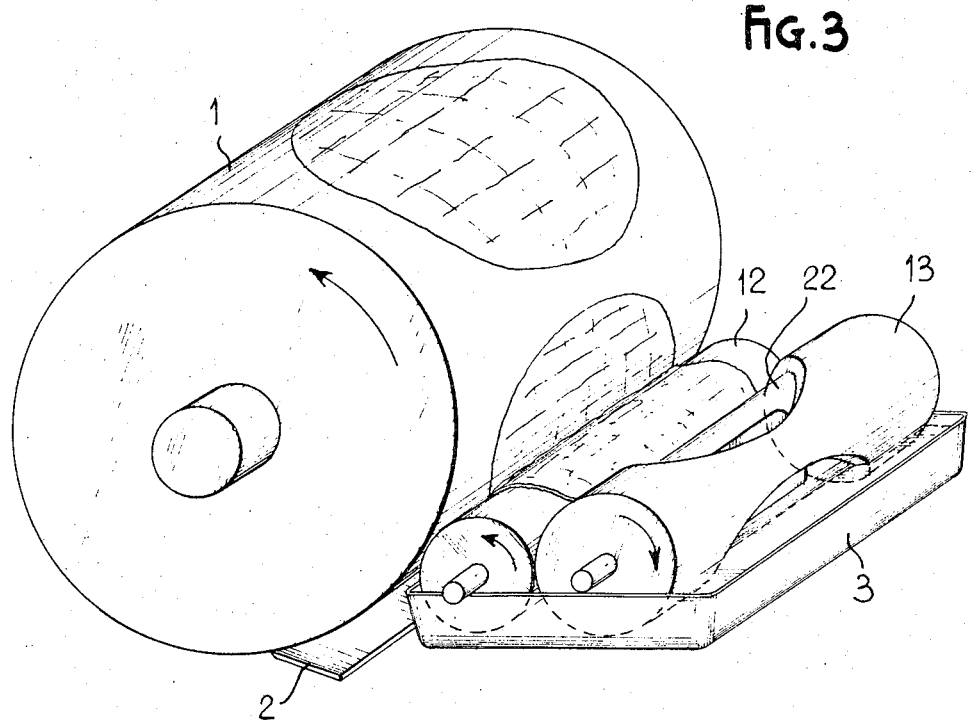
FIG. 3 is a diagrammatic perspective view of the arrangement of the three associated rollers during the operation.

The operating principle of the device according to the invention will be described with particular reference to the simplified isometric projection of FIG. 3 of the drawings. The lower part of the smooth transfer roller 12 is immersed in the liquid paste contained in the trough 3 and this roller is rotated in the direction indicated by the arrow, due to which movement it carries along a film of paste and deposits it on the surface of the cooking roller 1 whilst the latter rotates. As is apparent from the figure, the transfer roller 12 rotates in the same direction as the cooking roller 1, that is to say that their respective tangential speeds are added together along the generatrix of the roller 1 where the film of liquid paste is deposited at the instant in question. In fact tests have shown that this relative direction of rotation of the two rollers makes it possible to effect a more homogeneous deposit than in the opposite direction. The space between the surface of the two rollers is moreover sufficiently reduced in order that the liquid paste cannot escape through this narrow gap, an effect which is also reinforced by the rapid "pick up" of the paste in contact with the heated surface of the roller 1. It will also be understood that the amount of liquid paste conveyed by the transfer roller 12 is at least approximately proportional to the speed of rotation of the latter; by varying the rotational speed of the roller 12, it is thus possible to determine within certain limits the thickness of the layer of paste deposited on the cooking roller 1 and consequently that of the product obtained. The adjustment of the rotational speed of the transfer roller 12 may be effected in any appropriate manner: for example it is thus possible to drive the transfer roller 12 from a power taken off from the mechanism for controlling the cooking roller, by the intermediary of a mechanical speed regulator of any known type; as a variation it is also possible to provide a separate drive mechanism such as for example an electric reduction motor whose speed is controlled by notches or continuously by means of an appropriate control member.

Figure 2:
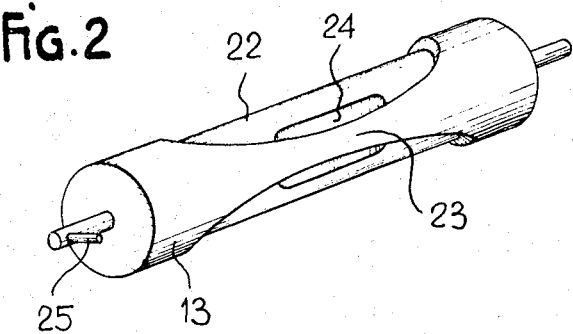
FIG. 2 shows in perspective a preferred embodiment of the shaping roller.
Figure 4:
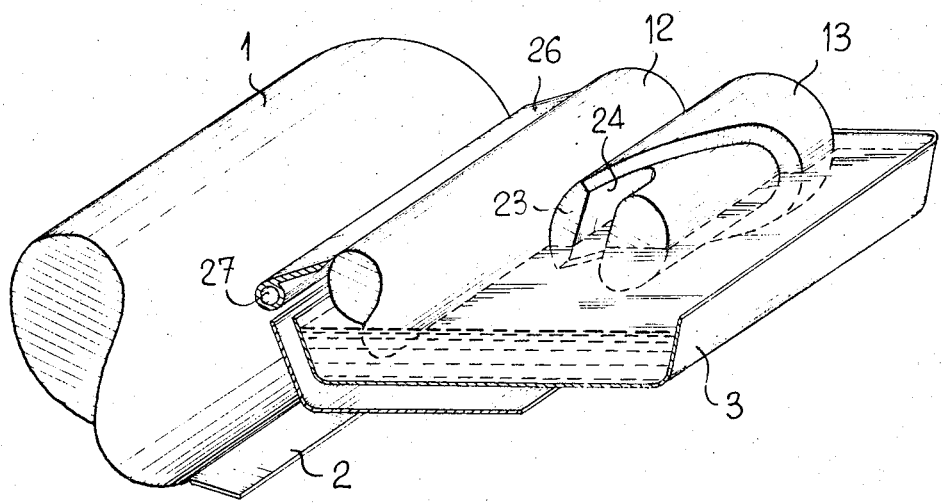
FIG. 4 is a view similar to that of FIG. 3 but relating to a modification, in this case the rollers being in the operative position and shown in section.

The shaping roller 13 which may be made of metal or possibly of a material having elastic properties, in particular rubber, is shown in isometric projection in FIG. 2 of the drawings. On its periphery this roller has a recessed impression 22, the depth of which may reach 5 to 6 mm for example and the evolute of which follows the shape of an ellipse having its major axis parallel to that of the roller, the winding of this ellipse about the roller leaving a flat part 23 between the ends of its minor axis. The shaping roller 13 which may also be advantageously immersed at its lower end in the liquid paste bears against the transfer roller 12 at a point of the trajectory of the film of liquid paste between the trough 3 and the surface of the cooking roller 1. The roller 13 is rotated in the direction indicated by the arrow, that is to say in the opposite direction to the cooking roller 1 and transfer roller 12. Its drive is effected by a power take off from the mechanism controlling the cooking roller 1 such that its angular speed is equal or proportional to that of this roller. The drive device is designed such that when the machine is inoperative (the case illustrated by FIG. 4 of the drawings), the shaping roller 13 bears against the transfer roller 12 at its flat part 23. In this way, even if the transfer roller 12 is rotating, no liquid paste is conveyed towards the cooking roller 1 since the film of liquid paste carried along by the roller 12 is stopped by the continuous wall opposing it constituted by the flat part 23 of the shaping roller 13. When the machine is operating, the cooking roller 1 and the shaping roller 13 start up simultaneously and the continuity of contact between the shaping roller 13 and the transfer roller 12 is broken by the progressive passage of the recessed impression 22 along the line of contact. A film of liquid paste whose width is limited at any moment by the edges of the impression 22 thus passes on the surface of the transfer roller 12 towards the cooking roller 1; this film of paste, firstly limited to a narrow strip centered on the median plane of the transfer roller 12, widens out rapidly on either side up to a maximum value corresponding to the length of the major axis of the ellipse defining the impression 22, then once more narrows down until it disappears when the shaping roller 13 has completed its rotation. The shape of the layer of paste deposited on the surface of the cooking roller 1 thus reproduces the shape of the recessed impression 22 in relation to the tangential speeds of the cooking roller 1 and shaping roller 13. In the case under consideration in which the machine is intended for the manufacture of pancakes or other products having a circular shape, the major axis of the ellipse defining the evolute of the impression 22 must thus be equal to the diameter of the product to be obtained, whereas its minor axis must represent a fraction of the major axis equal to the ratio of the tangential speed of the roller 13 and roller 1. In order to avoid the risk of the formation of lumps on the surface of the film of liquid paste carried along by the transfer roller 12 due to the accumulation of air inside the recessed impression 22, an aperture 24 of relatively large section may advantageously be provided through the depth of the shaping roller 13 to interconnect the regions of the impression 22 adjacent to the ends of the minor axis of the ellipse.

Although the transfer and shaping device above-described is designed for the production of pancakes or other similar products having a circular shape, it should however be understood that this is only a particular application which does not limit the scope of the present invention. It would obviously be easy to adapt the device to the production of articles of any shape whatever since consequently it would be sufficient to provide the shape of the impression 22 cut in the surface of the shaping roller 13. Likewise, the shaping roller 13 could comprise several impressions identical or otherwise. In particular a machine provided for producing round pancakes of large dimensions (35 to 40 cm diameter) could readily be adapted to the production of smaller pancakes (15 to 18 cm diameter) by providing two separate recessed impressions 22 along the length of the shaping roller 13. Taking into account these various possibilities, the machine may even be supplied with a set of interchangeable shaping rollers provided with impressions which vary in number, shape and dimensions according to the features of the products to be manufactured. The interchangeability of these rollers will be facilitated if a simple crank coupling device such as that illustrated by the reference 25 in FIG. 2 of the accompanying drawings is used for their drive.

No hypothesis has been made in the aforesaid with regard to the nature of the rotational movement of the cooking roller 1 (continuous or discontinuous) nor with regard to the dimensions of this roller and in particular on its perimeter. In the case of a cooking roller of relatively large diameter and which cooks several pancakes during each revolution (the case of FIG. 3), the shaft of the transfer roller 12 may be readily located at a lower level than that of the cooking roller. It may however, be preferred to reduce the diameter of the cooking roller as far as possible, in particular to save on weight and bulk of the machine as well as on its consumption of electric current. In particular, the cooking roller may be provided to cook only a single pancake during each revolution, whether its movement is continuous or discontinuous. It may even be so reduced in diameter that a cooked end of the pancake is already detached by the scraper 2 whilst the opposite end is still on the heated surface; this naturally implying that the drive of this roller is continuous. In the latter case, the corresponding reduction of the tangential speed of the cooking roller may be such that there is a risk of clogging due to a premature cooking of the film of paste on the surface of the transfer roller 12 in the region closest to the surface of the cooking roller 1. To obviate this risk it is possible to use the arrangement illustrated in FIG. 4 of the drawings, which differs essentially from that of FIG. 3 by the fact that the shaft of the transfer roller 12 is located at a slightly higher level than that of the cooking roller 1 and that the surfaces of these two rollers are kept apart by an appreciable distance. The conveyance of the film of liquid paste is ensured in this case from one roller to the other by the intermediary of a fixed blade 26 forming a transfer member, keyed with an appropriate inclination so that it permanently scrapes the surface of the transfer roller 12. This blade 26 is advantageously cooled at least at its part closest to the surface of the cooking roller 1, for example by means of a circulation of water inside a passage 27. Moreover, as a variation, there is nothing to prevent the arrangement of FIG. 3 being retained if the transfer roller 12 is artificially cooled to avoid the risk of premature cooking of the film of paste on its surface. Nevertheless, for reasons which will be readily understood, this solution is more difficult to carry out than that of FIG. 4.

Naturally, the scope of the invention is not limited to the embodiments afore-described and illustrated in the accompanying drawings, but on the contrary it extends to all variations which can be easily imagined and which are inspired by the same principles.

I claim:

1. A machine for manufacturing pancakes or other similar products comprising a trough for the liquid paste, a smooth cooking roller having a rotatable horizontal shaft, a transfer and shaping device which, firstly conveys a film of liquid paste from the trough and deposits it on the heated surface of said roller whilst the latter rotates and which, secondly automatically varies the width of the film of paste in order to give the product resulting from the cooking the desired shape, which may be circular for example and a device ensuring the detachment of the product obtained by cooking the paste on the roller and its removal from the machine, the transfer and shaping device being composed of two rollers whose shafts are parallel to that of the cooking roller, namely a smooth transfer roller located adjacent to the cooking roller in such manner that its lower part is immersed in the liquid paste and having a rotational movement due to which it carries along a film of paste and deposits it on the cooking roller and a shaping roller bearing against said transfer roller at a point of the trajectory of the film of liquid paste, this roller whose rotation is synchronized with that of the cooking roller having on its periphery at least one recessed impression whose shape corresponds to that of the product to be obtained and the edges of which in contact with the transfer roller at any time limit the width of the film of paste carried along by the latter.

2. A machine according to claim 1, in which the transfer roller rotates in the same direction as the cooking roller and at an adjustable speed whose value determines the thickness of the layer of paste deposited on this roller.

3. A machine according to claim 2, in which the transfer roller is set in motion by the mechanism driving the cooking roller via a mechanical speed regulator.

4. A machine according to claim 2, in which the transfer roller is set in motion by a separate drive mechanism such as for example an electric reduction motor.

5. A machine according to claim 2, in which the shaft of the transfer roller is located at a lower level than that of the cooking roller and in that the surfaces of the two rollers are separated in the operating position solely by a narrow gap.

6. A machine according to claim 2, in which the shaft of the transfer roller is located at a higher level than that of the cooking roller and in that the surfaces of the two rollers are separated by an appreciable gap, the conveyance of the film of liquid paste between the two rollers being undertaken by a fixed transfer member in the form of an inclined plane.

7. A machine according to claim 6, in which the fixed transfer member is artificially cooled at least in its part nearest the cooking roller, for example by means of a circulation of water.

8. A machine according to claim 1, in which the shaping roller which is also preferably immersed at its lower part in the liquid paste is rotated in the opposite direction to the transfer roller and at an angular speed equal or proportional to that of the cooking roller.

9. A machine according to claim 8 intended for the manufacture of pancakes or other products having a circular shape, in which the evolute of the recessed impression cut in the surface of the shaping roller is an ellipse whose major axis is equal to the diameter of the product to be obtained and whose minor axis represents a fraction of the major axis equal to the ratio of the tangential speed of the shaping and cooking rollers.

10. A machine according to claim 9, in which an aperture of relatively large section is cut through the depth of the shaping roller to interconnect the regions of the impression adjacent the ends of the minor axis of the ellipse.

11. A machine according to claim 1, having a set of interchangeable shaping rollers provided with impressions which vary in number, shape and dimensions according to the features of the products to be manufactured.

12. A machine according to claim 1, in which the transfer roller, the shaping roller, the trough for liquid paste and its possible filling tank are associated in the form of an arrangement mounted on a rigid support which itself rests on a pivoted positioning system which can be moved away from the cooking roller for the purposes of cleaning and maintenance.

13. A machine according to claim 12, in which the ends of the shafts of the transfer roller and shaping roller are received in guide notches provided in the lateral walls of the liquid paste tank, as well as in other notches having different orientations formed in the pivoting lateral forks whose pivoting movement towards the rear makes it possible to release said rollers for the purpose of cleaning or replacement.

14. A machine according to claim 13, in which the edges of the notches of the pivoting lateral forks bear against the ends of the shaft of the shaping roller to which they transmit an elastic force intended to keep said roller applied against the transfer roller.

15. A machine according to claim 1, in which the transfer roller, shaping roller, the trough for liquid paste and its possible filling tank are associated in the form of an arrangement permanently fixed to the frame of the machine, whereas the bearings supporting the cooking roller are mounted in pivoted supports which make it possible to move the latter away from said arrangement to facilitate the cleaning and maintenance thereof.

* * * * *